(12) United States Patent
Sorkin (10) Patent No.: US 7,116,073 B1
(45) Date of Patent: Oct. 3, 2006

(54) METHODS AND APPARATUS FOR CONTROLLING A MOTOR/GENERATOR

(75) Inventor: Lev Sorkin, Cranford, NJ (US)

(73) Assignee: Innovative Power Solutions, LLC, Eatontown, NJ (US)

( * ) Notice: Subject to any disclaimer, the term of this patent is extended or adjusted under 35 U.S.C. 154(b) by 78 days.

(21) Appl. No.: 11/200,835

(22) Filed: Aug. 10, 2005

(51) Int. Cl.
*H02P 1/18* (2006.01)
*H02P 27/05* (2006.01)

(52) U.S. Cl. .................. 318/530; 318/162; 318/431

(58) Field of Classification Search .............. 318/162, 318/430–434, 521, 523, 530; 388/904
See application file for complete search history.

(56) References Cited

U.S. PATENT DOCUMENTS

| | | | |
|---|---|---|---|
| 3,702,569 A * | 11/1972 | Quinn et al. ............. 74/5.47 |
| 4,851,766 A * | 7/1989 | Shiobara et al. ............ 324/772 |
| 4,939,441 A * | 7/1990 | Dhyanchand ............. 318/718 |
| 5,036,267 A | 7/1991 | Markunas et al. |
| 5,055,764 A | 10/1991 | Rozman et al. |
| 5,097,195 A | 3/1992 | Raad et al. |
| 5,305,234 A * | 4/1994 | Markus et al. ............. 702/132 |
| 5,488,286 A | 1/1996 | Rozman et al. |
| 5,493,201 A | 2/1996 | Baker |
| 5,495,163 A | 2/1996 | Rozman et al. |
| 5,502,368 A * | 3/1996 | Syverson et al. ............. 322/28 |
| 5,512,811 A | 4/1996 | Latos et al. |
| 5,594,322 A | 1/1997 | Rozman et al. |
| 5,850,138 A * | 12/1998 | Adams et al. ............. 322/68 |
| 6,072,303 A * | 6/2000 | Nickoladze et al. ......... 322/20 |
| 6,768,278 B1 | 7/2004 | Xu et al. |

* cited by examiner

*Primary Examiner*—Bentsu Ro

(57) ABSTRACT

Methods and apparatus provide for: commutating windings of a polyphase machine such that electromagnetic fields of stator and rotor phases of the polyphase machine produce at least one of motoring and generating torque; providing a first rotor excitation voltage having substantially no DC component when a rotational speed of the polyphase machine is below a predetermined value; and providing a second rotor excitation voltage having a DC component when the rotational speed of the polyphase machine is above the predetermined value.

32 Claims, 8 Drawing Sheets

| SPEED | ANGLE CORRECTION |
|:-----:|:----------------:|
| 0 | +10 |
| 2 | +5 |
| 5 | -0 |
| 7 | -5 |
| 10 | -10 |
| 100 | -20 |
| 500 | -30 |
| 1000 | -40 |
| 1500 | -50 |
| 2000 | -60 |
| 2500 | -70 |
| 3000 | -80 |
| 3500 | -90 |

METHODS AND APPARATUS FOR CONTROLLING A MOTOR/GENERATOR

BACKGROUND OF THE INVENTION

The present invention relates to methods and apparatus for controlling the torque/speed characteristics of a polyphase motor and/or generator.

Polyphase machines, such as permanent magnet machines, synchronous machines, and wound rotor machines must be driven such that the windings thereof are energized as a function of the rotor position (and, thus, the rotor flux) in order to obtain driving torque from the machine (for motoring) and/or to obtain opposing torque to from the machine (for generating).

Polyphase machines may be utilized as variable starter-generator machines for an engine, such as a turbine engine. A turbine engine is started by using the polyphase machine to apply torque to a main shaft of the turbine engine, while also providing fuel and other combustion elements to the engine. When the polyphase machine is controlled to produce a suitable torque verses speed characteristic, the turbine engine will start. At or some time after the start event, the polyphase machine may stop applying torque to rotate the turbine engine and the polyphase machine may be controlled in such a way as to generate electricity in response to torque applied to the polyphase machine by the turbine engine.

A desirable torque verses speed characteristic of the polyphase machine acting as a motor to start a turbine engine includes a particular peak torque (or range of torques) substantially at the ignition speed of the turbine engine. When the torque produced by the polyphase machine is too high at the ignition speed, then any number of mechanical linkages of the turbine engine may be overstressed. Conversely, when the peak torque produced by the polyphase machine is too low at the ignition speed, it may take an excessive period of time to reach the start event. An excessive torque or an insufficient torque condition at the ignition speed leads to undesirable results. For example, overstressing mechanical linkages within the turbine engine reduces engine life and decreases the mean time between failures (MTBF). Similarly, excessively long engine start conditions result in increased engine temperature (as it is typical that no air venting in the engine exists during startup), wasted fuel, reduced engine life, decreased MTBF, and false starts.

The conventional approach to designing the polyphase machine and a control system therefore is to optimize the design of the polyphase machine as a generator. This is so because, for example, in aeronautics the polyphase machine is utilized as a generator on the order of 99% of the time and is used as a motor 1% of the time or less. Unfortunately, optimizing the characteristics of the polyphase machine as a generator does not result in an optimum design of the polyphase machine as a motor. The conventional design approach also dictates that the control of the polyphase machine as a motor establishes a fixed lead angle of the electromagnetic field of a stator of the polyphase machine as compared with the electromagnetic field of a rotor of the polyphase machine. Thus, the electrical characteristics of the polyphase machine acting as a motor are carried over and accepted as a necessary result of optimizing the polyphase machine as a generator. However, this leads to undesirable results in connection with controlling the polyphase machine as a motor. For example, a controller and driver of the polyphase machine may need to be relatively oversized as compared with a controller and driver designed for an optimized motor (instead of a generator). Alternatively, the proper peak torque at ignition characteristic might not be achievable in a polyphase machine that has been optimized as a generator. In this situation, the characteristics of the polyphase machine as a generator may need to be sacrificed for achieving a desirable torque verses speed motoring characteristic. Unfortunately, this may cause undesirable results during a generating mode (which is the more likely mode of operation), and increased machine weight.

The conventional control techniques of polyphase machines have also been unsatisfactory in connection with starting the polyphase machine at zero speed. Indeed, many kick start techniques involve complex closed loop circuit configurations that are costly.

Another shortcoming of the conventional control techniques of wound rotor polyphase machines involves the excitation voltage for the rotor. Conventional techniques call for relatively high peak-to-peak AC characteristics with corresponding high peak currents, to drive the rotor winding. This creates relatively high power losses and electromagnetic interference profiles.

Conventional control techniques of polyphase machines have also been unsatisfactory in connection with so-called soft start techniques and so-called soft stop techniques inasmuch as the control technologies have been somewhat complex and costly. Without soft start and soft stop control technologies, the polyphase machine may introduce sharp mechanical impulses during ignition, which reduces the useful life of engine bearings.

The conventional polyphase machine control techniques have also been deficient in the area of battery usage during motoring. In particular, the conventional control techniques call for the same torque/speed control profile for the polyphase machine during startup no matter how many startup attempts are made. Unfortunately, a single startup attempt may utilize 50% or more of the battery capacity in an aircraft. Thus, multiple start attempts could easily deplete the battery. A related problem is that a lower battery voltage requires an increase in the current drawn from the battery to achieve the same torque/speed profile, thereby invoking undesirable circumstances resulting from increased current draw from the battery.

Accordingly, there are needs in the art of new methods and apparatus for controlling a polyphase motor that produce more optimum torque versus speed characteristics from the polyphase machine during motoring and/or generating.

SUMMARY OF THE INVENTION

In accordance with one or more aspects of the present invention, methods and apparatus provide for: commutating windings of a polyphase machine in response to commutation control signals; producing the commutation control signals such that electromagnetic fields of stator phases of the polyphase machine at least lead electromagnetic fields of rotor phases of the polyphase machine to produce motoring torque; and automatically varying a lead angle measured between the electromagnetic fields of the stator and rotor phases as a function of a rotational speed of the polyphase machine.

The method and apparatus may further provide for: monitoring an angular position of the rotor of the polyphase machine; augmenting the angular position with the lead angle; and producing the commutation control signals as a function thereof to produce motoring torque from the polyphase machine. Additional provisions may include selecting the lead angle as a function of respective ranges of rotational speeds of the polyphase machine. Additional or alternative provisions may include: associating a first lead angle is with a first range of rotational speeds, associating a second lead angle with a second range of rotational speeds, and so on; and selecting and/or changing the lead angle as a function of which range of rotational speeds encompasses the rotational speed of the polyphase machine at a given point in time.

The method and apparatus may further provide for: selecting the lead angle by matching the rotational speed of the polyphase machine at a given point in time with one of a plurality of entries of one or more tables, wherein each entry includes an indication of a respective one of the ranges of rotational speeds and an associated one of the lead angles.

The method and apparatus may further provide for: monitoring an angular position of the rotor of the polyphase machine; and determining and automatically augmenting the angular position with the lead angle, as a function of rotational speed of the polyphase machine, wherein determination of the lead angle enables the polyphase motor to achieve higher torques as a function of rotational speed as compared to fixed lead angle control of the polyphase motor.

Additional or alternative provisions may include: at least one of selecting and computing the lead angle as a function of respective ranges of rotational speeds of the polyphase machine. For example, a first range of rotational speeds may be established by: determining a first torque versus speed envelope for the polyphase machine using a fixed first lead angle; determining a second torque versus speed envelope for the polyphase machine using a fixed second lead angle; and determining a difference between an initial speed and a final speed substantially at which the first and second torque versus speed envelopes intersect. Further ranges of rotational speeds may be established by repeating the determining steps for further fixed lead angles.

Additional or alternative provisions may include varying the lead angle from a negative magnitude to a positive magnitude as a function of time when the rotational speed of the polyphase machine is less than a predetermined value. For example, the predetermined value may be about 10 RPM.

In accordance with one or more aspects of the present invention, methods and apparatus provide for: commutating windings of a polyphase machine such that electromagnetic fields of stator and rotor phases of the polyphase machine produce at least one of motoring and generating torque; and providing a first rotor excitation voltage having substantially no DC component when a rotational speed of the polyphase machine is below a predetermined value; and providing a second rotor excitation voltage having a DC component when the rotational speed of the polyphase machine is above the predetermined value.

For example, the first rotor excitation voltage may be an AC signal of peak amplitude +/−A from a reference potential; and the second rotor excitation voltage may be an AC signal with a DC offset having a peak amplitude of +/−A/2 from a reference potential of A/2. Preferably, the first and second rotor excitation voltages are substantially square wave signals.

The methods and apparatus may further provide for: decreasing the peak amplitude of the second rotor excitation voltage as a function of the rotational speed over at least a range of rotational speeds above the predetermined value.

Additionally or alternatively, the methods and apparatus may further provide for: increasing the DC component of the second rotor excitation voltage as a function of the rotational speed over at least a range of rotational speeds above the predetermined value. Foe example, the second rotor excitation voltage may be substantially a square wave; and the methods and apparatus may provide for increasing or decreasing the DC component of the second rotor excitation voltage by changing a duty cycle of the second rotor excitation voltage.

Additionally or alternatively, the second rotor excitation voltage further may include an AC component; and the methods and apparatus may further provide for decreasing a frequency of the AC component of the second rotor excitation voltage as a function of the rotational speed over at least a range of rotational speeds above the predetermined value.

In accordance with one or more aspects of the present invention, methods and apparatus provide for: commutating windings of a polyphase machine in response to commutation control signals; producing the commutation control signals such that electromagnetic fields of stator phases of the polyphase machine at least lead electromagnetic fields of rotor phases of the polyphase machine to produce starting torque for an engine from a battery system; commanding a first torque/speed profile for the polyphase machine during a first start cycle of the engine; and commanding a second torque/speed profile, lower than the first torque/speed profile, for the polyphase machine when the first start cycle is unsuccessful.

The methods and apparatus may further provide for monitoring an angular position of the rotor of the polyphase machine, determining and automatically augmenting the angular position with a lead angle, measured between the electromagnetic fields of the stator and rotor phases, as a first function of rotational speed of the polyphase machine, in order to achieve at least a portion of the first torque/speed profile. The methods and apparatus may further provide for changing the determined lead angle as a second function of rotational speed, in order to achieve at least a portion of the second torque/speed profile.

By way of example, the first torque/speed profile may include a first peak torque; the second torque/speed profile may include a second peak torque; and the first peak torque is preferably greater than the second peak torque.

The first torque/speed profile may include a first drop off rotational speed at which the controller at least begins to command the polyphase machine to stop providing starting torque to the engine. The second torque/speed profile may include a second drop off rotational speed at which the controller at least begins to command the polyphase machine to stop providing starting torque to the engine. Preferably, the first drop off rotational speed is greater than the second drop off rotational speed.

The methods and apparatus may further provide for: providing a first rotor excitation voltage having parameters that include at least one of first AC component characteristics, first DC component characteristics, first frequency characteristics, and first magnitude characteristics, as functions of the rotational speed of the polyphase machine; and providing a second rotor excitation voltage having parameters that include at least one of second AC component characteristics, second DC component characteristics, second frequency characteristics, and second magnitude characteristics, as functions of the rotational speed of the polyphase machine. The methods and apparatus may further provide for producing the first rotor excitation voltage in connection with the first torque/speed profile; and producing the second rotor excitation voltage in connection with the second torque/speed profile.

Other advantages, features, and aspects of the invention will be apparent to one skilled in the art in view of the discussion herein taken in conjunction with accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION

Figure 1:
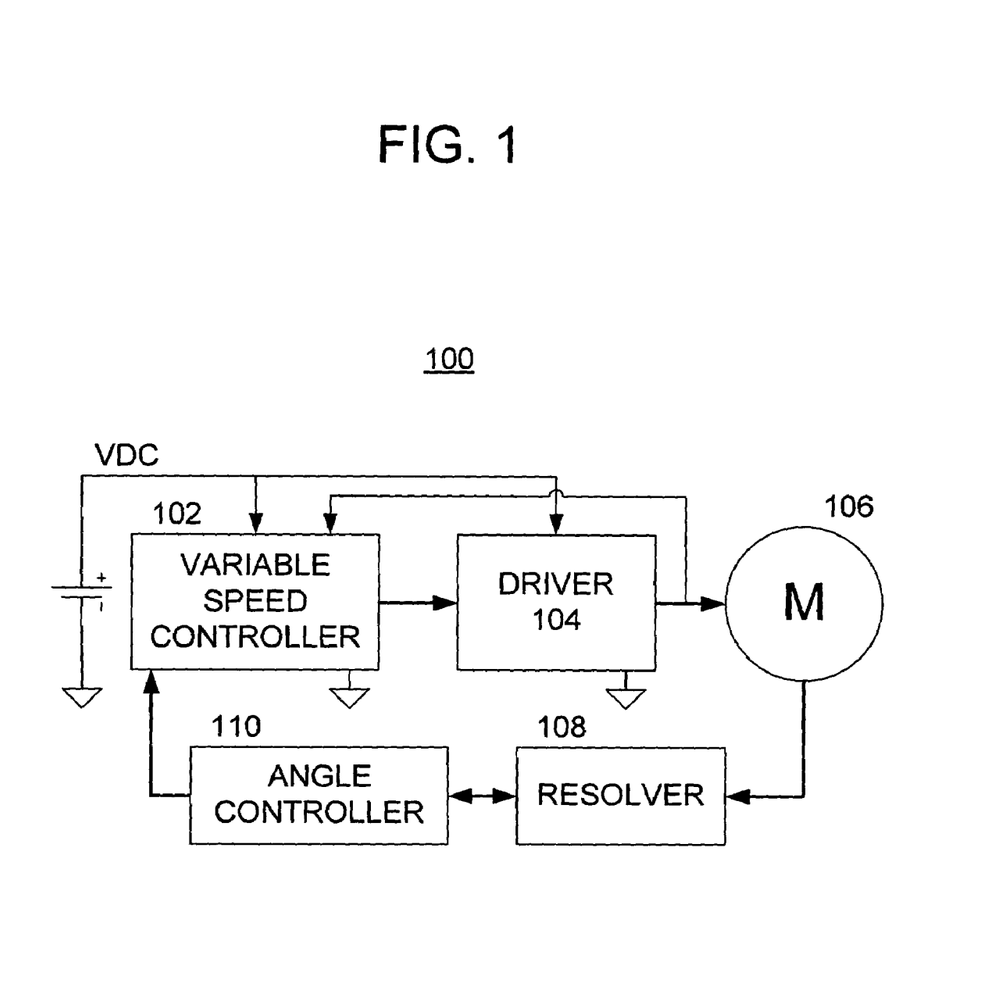
FIG. 1 is a block diagram illustrating a system for controlling and driving a polyphase motor in accordance with one or more aspects of the present invention.

Referring now to the drawings, wherein like numerals indicate like elements, there is shown in FIG. 1 a block diagram illustrating one or more aspects of the present invention. For the purposes of brevity and clarity, the block diagram of FIG. 1 will be referred to, and described herein, as illustrating a system 100, it being understood, however, that the description may be readily applied to various aspects of one or more methods of the present invention with equal force.

The system 100 includes a source of DC power, a controller 102 (preferably a variable speed controller), and a driver circuit 104 that are operable to control and drive a polyphase machine 106. The system 100 also includes a resolver 108 and an angle controller 110 that are operable to measure the rotor position of the polyphase motor 106 and to provide feedback and angle correction signaling to the controller 102. Although the functional blocks for the controller 102, driver 104, resolver 108, and angle controller 110 are chosen for purposes of clarity and ease of description, those skilled in the art will appreciate that difference functional delineations may be utilized without departing from the spirit and scope of the present invention. For example, the "controller" may include the variable speed controller 102, the driver 104, the resolver 108, and the angle controller 110 or any combination thereof.

It is noted that the polyphase motor 106 may be a polyphase AC machine, a permanent magnet (PM) machine, a brushless DC machine, an induction machine, a synchronous machine, a wound rotor machine, etc. The illustrative embodiments described herein are described with reference to a polyphase machine 106 that may operate as a motor or a generator depending on how it is controlled and what mechanical loads/sources are applied to/from its output shaft. It is understood, however, that skilled artisans can easily apply the details of these illustrative embodiments in connection with other types of machines.

The DC source produces a voltage, VDC, with respect to ground that is utilized to provide an operating power (usually of a relatively low voltage and current) to the controller 102 and to provide bus power (usually of relatively high voltage and current) to the driver circuit 104. The invention contemplates that the normal voltage level of the DC source may take on any value. When the voltage level of the DC source is relatively low, such as 24 volts, the DC source may directly provide the operating DC voltage to the controller 102. When the voltage level of the DC source is higher than the maximum operating DC voltage level of the controller 102, however, an additional voltage regulating device (not shown) may be necessary between VDC and the controller 102 to provide the operating DC voltage.

The controller 102 provides commutation control signals to the driver circuit 104 such that the driver circuit 104 can properly energize the stator windings of the machine 106. The windings of the machine 106 are typically in the standard DELTA configuration, but may alternatively be in the WYE configuration. The windings may be any number of phases, such as 3 phase, 6 phase, etc. The driver circuit 104 provides various current paths among the windings, the bus, and ground in order to drive the polyphase machine 106. The controller 102 may monitor the voltages and/or current of the windings of the machine 106 and, in conjunction with angular control signaling from the angle controller 110, produce commutation control signals to the driver circuit 104 such that the windings of the machine 106 achieve desirable voltage, current, and phase characteristics that are synchronized with the rotor position of the polyphase machine 106.

For example, during a motoring mode of operation, the controller 102 is operable to provide commutation control signals to the driver circuit 104 such that the windings of the polyphase machine 106 are commutated in a way that causes the machine 106 to produce motoring torque. This may be useful, for example, in starting a turbine engine. To produce motoring torque, the controller 102 is operable to provide commutation control signals to the driver circuit 104 such that the electromagnetic field(s) of the stator windings lead the electromagnetic field(s) of the rotor windings (or magnets). Alternatively, during a generating mode of operation, the controller 102 is operable to provide commutation control signals to the driver circuit 104 such that the synchronous rectification is provided for the synchronous machine (resulting in the DC generator lower rectification losses). This may be useful, for example, in providing operating power to an electrical system to which the turbine engine is connected. To generate output voltage for an induction machine, the controller 102 is operable to provide commutation control signals to the driver circuit 104 such that the electromagnetic field(s) of the stator windings lag the electromagnetic field(s) of the rotor windings (or magnets).

In contrast to the deficiencies of the prior art, various aspects of the present invention contemplate optimizing the characteristics of the polyphase machine 106 for generating and improving the torque/speed characteristics of the polyphase machine 106 during motoring by a novel controlling technique. While the present invention is not intended to be limited by any theory of operation, reference is now made to FIG. 2, which is a graphical representation of torque (or current) verses speed characteristics of the polyphase machine 106 under varying conditions. The torque/speed curve 200 is intended to represent a typical profile for the polyphase machine 106 if it were controlled utilizing a fixed lead angle measured between the electromagnetic fields of the stator and rotor phases of the polyphase machine 106. Such a profile might be useful in operating the polyphase machine 106 as a motor in order to start a turbine engine if the peak torque at the ignition speed was within a desirable range.

Figure 2:
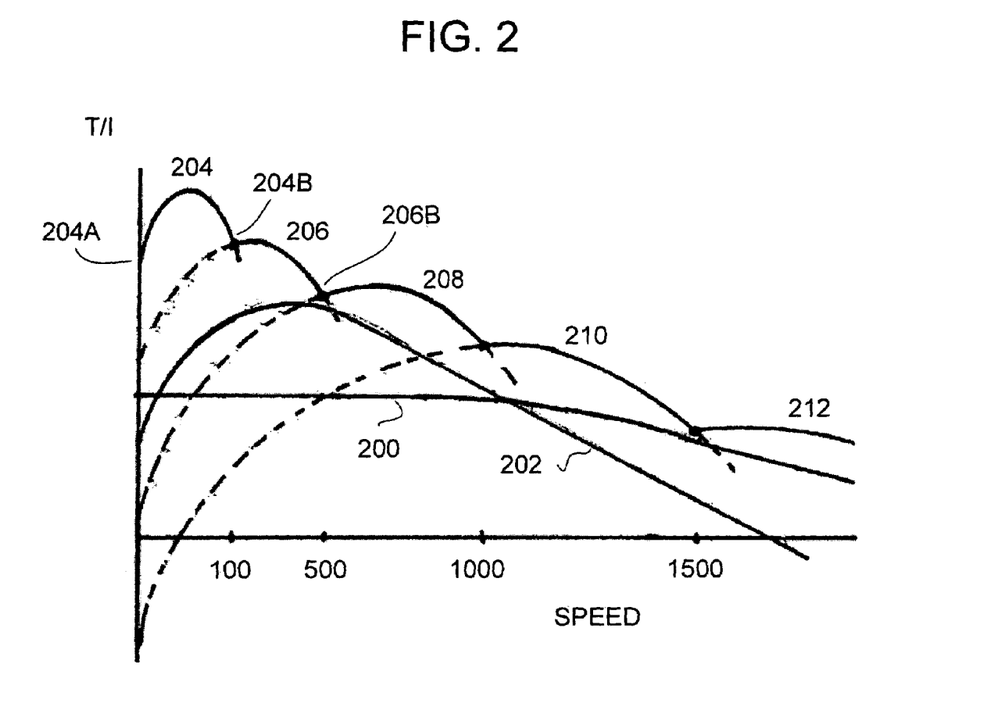
FIG. 2 is a graphical representation of torque and/or current versus speed characteristics of a polyphase motor.

In accordance with one or more aspects of the present invention, however, the peak torque at ignition produced by the polyphase machine 106 may be increased, such as to achieve the curve 202, without changing the construction of the polyphase machine 106. To this end, the controller 102 is preferably operable to automatically vary the lead angle as a function of the rotational speed of the polyphase machine 106. As will be discussed in more detail herein below, the controller 102 is preferably operable to increase the lead angle as a function of increasing rotational speed of the polyphase machine 106 in order to increase (or otherwise improve) the torque/speed characteristics of the polyphase machine 106 operating as a motor. This is preferably achieved by monitoring the angular position of the rotor of the polyphase machine 106 by way of the resolver 108 and angle controller 110 such that the angle controller 110 may augment the angular position with the lead angle. This information is preferably input to the controller 102 such that the commutation control signals produced by the controller 102 achieves the desirable lead angle and, therefore, the desirable torque/speed characteristics.

Turning again to FIG. 2, the controller 102 is preferably operable to select the lead angle as a function of respective ranges of rotational speeds of the polyphase machine 106. In other words, a first lead angle is preferably associated with a first range of rotational speeds, a second lead angle is preferably associated with a second range of rotational speeds, and so on. The controller 102 is preferably operable to select (or alternatively calculate) and/or change the lead angle as a function of which range of rotational speeds encompasses the rotational speed of the polyphase machine 106 at a given point in time. This is believed to improve the torque/speed characteristics from the expected characteristic 200 associated with a fixed lead angle to the characteristic 202, which exhibits improved torque/speed characteristics.

The ranges of rotational speeds of the polyphase machine 106 and the associated lead angles are preferably established as follows: A first range of rotational speeds may be established by (i) determining a first torque verses speed envelope for the polyphase machine 106 using a fixed first lead angle; (ii) determining a second torque verses speed envelope for the polyphase machine using a fixed second lead angle; and (iii) determining a difference between an initial speed and a final speed substantially at which the first and second torque verses speed envelopes intersect.

By way of example, the first torque verses speed envelope may be represented by curve 204 in FIG. 2, where curve 204 is established by fixing the lead angle of the polyphase machine 106 at, for example, five degrees. The input current to the polyphase machine 106 is then progressively increased to develop the torque/speed characteristic 204. The increase in input current to the polyphase machine 106 causes the machine to increase its rotational speed and increase its torque over a range of speeds. The increase in current, however, also increases the back electromotive force (BEMF), which eventually causes a reduction in motoring torque with increasing speed. This results in the characteristic of the torque/speed curve 204.

Next, the lead angle of the polyphase machine 106 is fixed at another level, such as 10 degrees, and the polyphase machine 106 is against operated at progressively increased input current. This results in a second torque/speed characteristic 206. As compared with the characteristic 204, the characteristic 206 exhibits higher torques at higher speeds, although the peak torque of characteristic 206 is relatively lower than the peak torque of characteristic 204. This process of characterizing the polyphase machine 106 in terms of fixed lead angles is preferably continued to get additional characteristics 208, 210, 212, etc. Those skilled in the art will appreciate from the description herein that any number of characteristic curves may be employed without departing from the spirit and scope of the present invention.

Assuming that the curve 204 is the first torque verses speed envelope and the curve 206 is the second torque verses speed envelope, the first range of rotational speeds may be defined as between an initial point 204A (0 rpm) and a final point 204B (about 100 rpm) at which curves 204 and 206 intersect. Preferably, the lead angle (5 degrees) at which the polyphase machine 106 was fixed in order to obtain the curve 204 is associated with the first range of rotational speeds. A second range of rotational speeds may be established by determining a difference between point 204B (100 rpm) and another point 206B (500 rpm) at which curves 206 and 208 intersect. The lead angle (10 degrees) at which the polyphase machine 106 was fixed in order to establish the curve 206 is preferably associated with the second range of rotational speeds. This process is preferably repeated for each of the ranges of rotational speeds and associated lead angles.

In accordance with one or more embodiments of the present invention, the controller 102 is preferably operable to at least one of select and compute the lead angle as a function of the respective ranges of rotational speeds of the polyphase machine 106. This permits the torque/speed characteristic 202 (and associated increased peak torque) as compared with the theoretical torque/speed characteristic 200 associated with a particular fixed lead angle.

Figure 3:
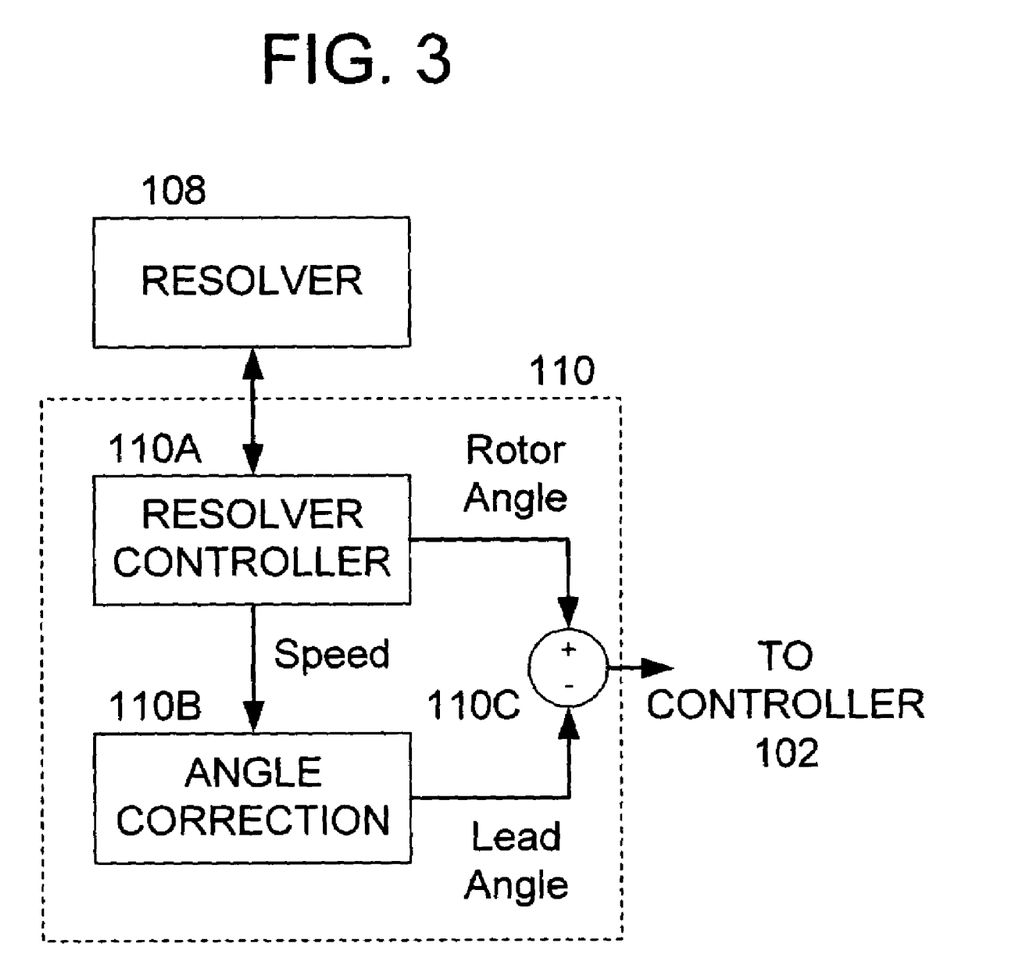
FIG. 3 is a block diagram illustrating a system for carrying out angular control techniques associated with the system of FIG. 1.

Reference is now made to FIG. 3, which is a block diagram illustrating a more detailed implementation of the angle controller 110 that is suitable for carrying out the above described determination of the lead angle as a function of the rotational speed of the polyphase machine 106. The angle controller 110 preferably includes a resolver controller 110A, and an angle correction circuit 110B, and a summing circuit 110C. The resolver controller 110A is preferably operable to establish a rotational speed and rotor angle of the polyphase machine 106 as a function of time. The speed determination of the resolver controller 110A is preferably input to the angle correction circuit 110B. The angle correction circuit 110B is preferably operable to determine the lead angle associated with the given rotational speed of the polyphase machine 106 in accordance with the aforementioned ranges of rotational speeds. The summing circuit 110C is preferably operable to take a difference of the rotor angle and the lead angle in order to produce a signal input to the controller 102 to achieve desirable commutation control signals for input to the driver 104. Those skilled in the art will appreciate, therefore, that the lead angle is preferably expressed in terms of a negative angle given that the summing circuit 110C includes the polarities shown. Those skilled in the art will appreciate that numerous other implementations may be employed where the lead angle is expressed either as a positive or negative angle.

Figure 4:
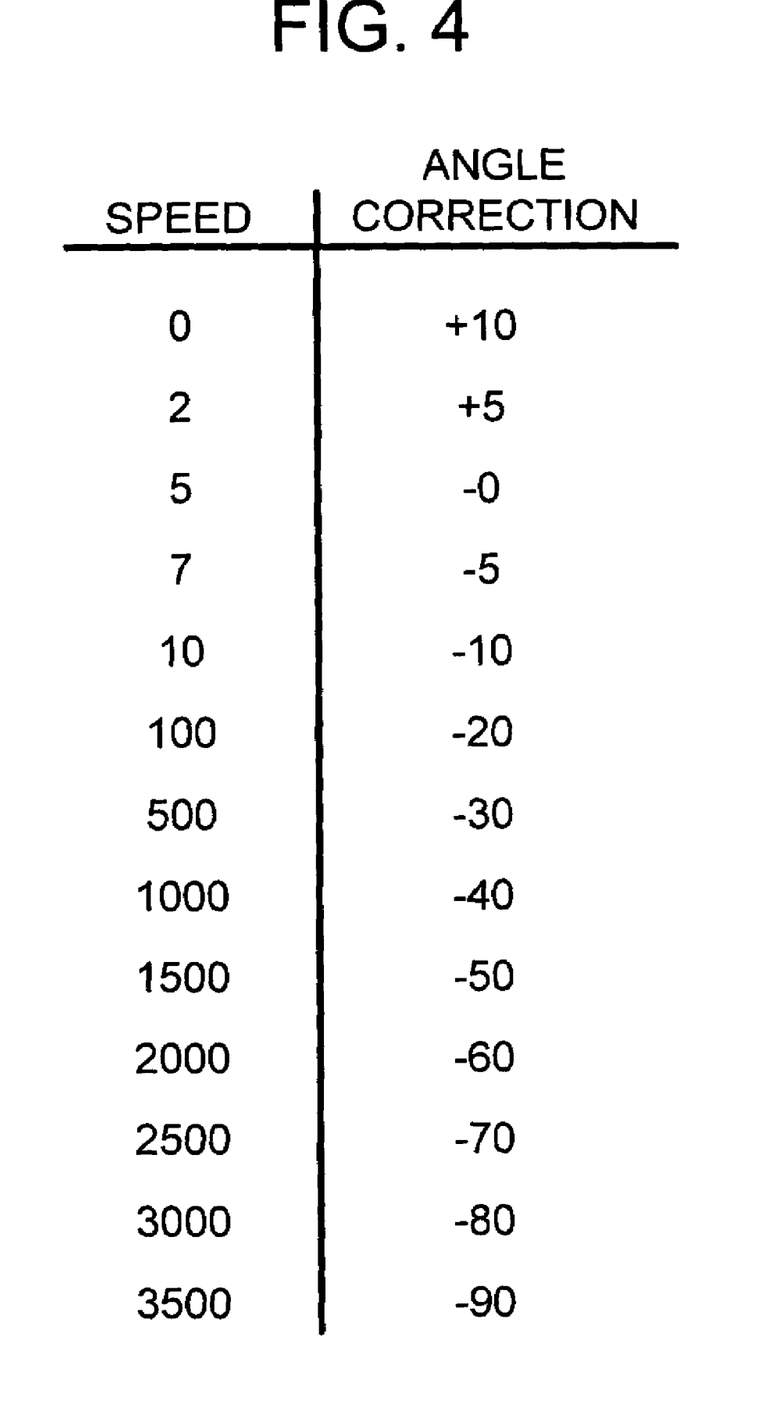
FIG. 4 is a table of angle correction and speed entries that may be utilized by the angular control of FIG. 3.

Reference is now made to FIG. 4, which is a table of angle correction (lead angles) and speed entries that may be utilized by the angle correction circuit 110B of FIG. 3. The table includes a plurality of entries, where each entry includes an indication of a respective one of the ranges of rotational speeds and associated one of the lead angles. By way of example, the lead angle of negative 10 is associated with the speed entry of 10, the lead angle of negative 20 is associated with the speed entry of 100, the lead angle of negative 30 is associated with the speed entry of 500, etc. Thus, in accordance with one aspect of the present invention, the lead angle of −10 may be associated with any speed between 10 and 99. Similarly, the lead angle of negative 20 may be associated with any rotational speed within 100 and 499, etc.

The angle correction circuit 110B is preferably operable to select the lead angle by matching the rotational speed of the polyphase machine 106 at a given point in time with one of the entries of the table. As shown in FIG. 3, the rotor angle is then augmented with the lead angle (utilizing the adding circuit 110C) to produce a signal for input to the controller 102.

Advantageously, the system 100 employing one or more of the aspects or embodiments discussed hereinabove is capable of controlling the polyphase machine 106 in a manner that achieves desirable torque/speed motoring characteristics (which indeed are an improvement over the typical characteristic) while also permitting the designer to optimize one or more features of the polyphase machine 106 in terms of operating in a generator mode. Further, the ability to control the polyphase machine 106 as described above may lead to advantageous reduction in the maximum current carrying requirements of, for example, the driver circuit 104, thereby leading to improve efficiencies and lower costs for implementation.

In accordance with one or more further aspects of the present invention, the controller 102 is preferably operable to vary the lead angle from a negative magnitude to a positive magnitude as a function of time when the rotational speed of the polyphase machine is less than a predetermined value. For example, when the rotational speed of the polyphase machine 106 is below about 10 RPM, the controller 102 may operate to vary the lead angle from about +10 degrees to −10 degrees as a function of time (instead of as a function of speed). This has been found to be advantageous in kick starting the machine 102 at zero or low speeds. With reference to FIG. 4, the kick start function may also implemented by having some entries containing rapidly changing lead angles associated with a small range of rotational speeds e.g., 0 to 10 rpm).

Figure 5:
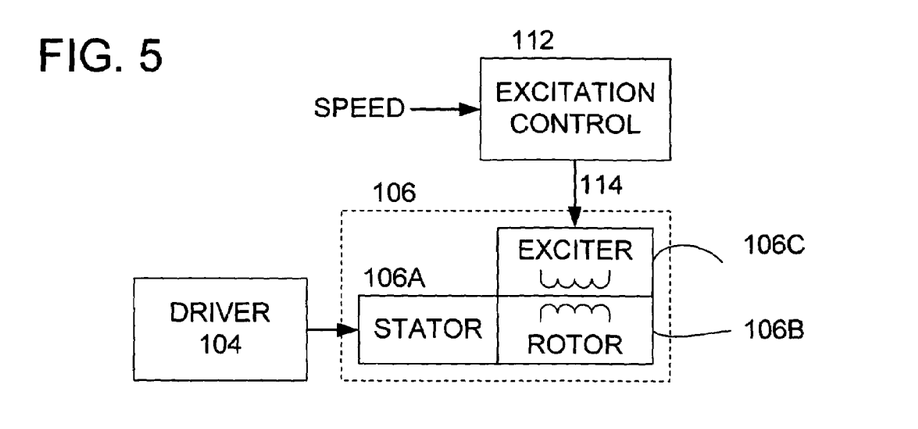
FIG. 5 is a block diagram illustrating an excitation control system that may be utilized by the system of FIG. 1 in connection with controlling a wound rotor machine.

Reference is now made to FIG. 5, which is a block diagram illustrating an excitation control system that may be utilized by the system 100 of FIG. 1 in connection with controlling a wound rotor machine. Those skilled in the art will appreciate that some implementations of the polyphase machine 106 may include a stator 106A, a wound rotor 106B, and an exciter 106C. While the driver circuit 104 is typically used to commutate the windings of the stator 106A of the polyphase machine 106, a wound rotor machine may also require an excitation voltage in order to induce an electromagnetic field in the rotor 106B in order to achieve motoring and/or generating torque in the polyphase machine 106.

Figure 6:
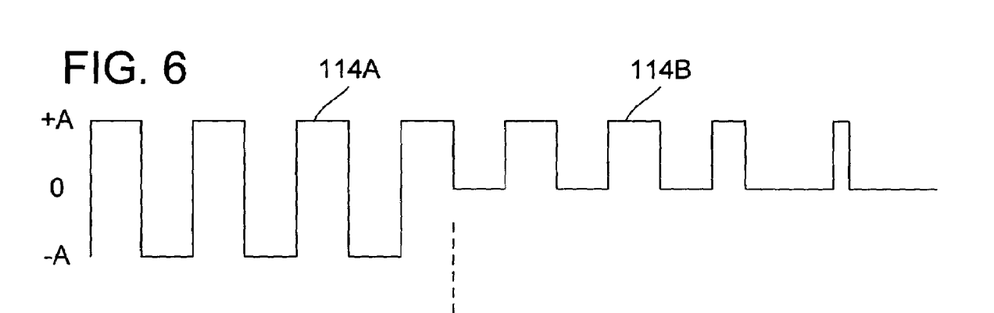
FIG. 6 is a graphical illustration of rotor excitation that may be produced by the excitation control system of FIG. 5.

In this regard, the system of FIG. 5 includes an excitation control circuit 112 that is operable to produce an excitation voltage on line 14 in response to at least a rotational speed of the polyphase machine 106. As discussed above, the rotational speed may be obtained by way of the resolver 108 and/or the angle controller 110 (FIG. 1). The excitation voltage 114 is input to the exciter 106C, which by transformer action induces an electromagnetic field in the rotor 106B. In accordance with one or more embodiments of the present invention, the excitation control circuit 112 is preferably operable to (i) provide a first rotor excitation voltage 114A having substantially no DC component when a rotational speed of the polyphase machine 106 is below a predetermined value and (ii) provide a second rotor excitation voltage 114A having a DC component when the rotational speed of the polyphase machine 106 is above a predetermined value. This is discussed in more detail with reference to FIGS. 6 and 7, which are a graphical illustration of rotor excitation and a graphical illustration of rotor excitation verses speed characteristics, respectively. As shown in FIG. 6, the first rotor excitation voltage 114A is produced by the excitation control circuit 112 so long as the rotational speed of the polyphase machine 106 is below a predetermined value, for example, about 1,000 RPM.

The first rotor excitation voltage 114A is an AC signal of peak amplitude +/−A from a reference potential, such as ground. In a preferred embodiment, the first rotor excitation voltage is substantially a square wave. Those skilled in the art will appreciate that the frequency and duty cycle of the first rotor excitation voltage 114A are functions of the electrical properties of the polyphase machine 106, specifically, the electromagnetic parameters of the rotor 106B. When the rotational speed of the polyphase machine 106 reaches the predetermined value (e.g., 1,000 RPM), the excitation control circuit 112 preferably modifies the excitation voltage and produces the second rotor excitation voltage 114B. The second rotor excitation voltage is an AC signal with a DC offset, having a peak amplitude of +/−A/2 from a reference potential of A/2. In the example illustrated in FIG. 6, the DC offset of the second rotor excitation voltage 114B is a positive offset of A/2. Those skilled in the art will appreciate that alternative embodiments of the present invention may employ negative DC offsets without departing from the spirit and scope of the present invention. In a preferred embodiment, the second rotor excitation voltage 114B is substantially a PWM square wave. PWM for the second case results in DC current flowing through the exciter 106C reducing the switching core losses thus improving the system efficiency.

Figure 8:
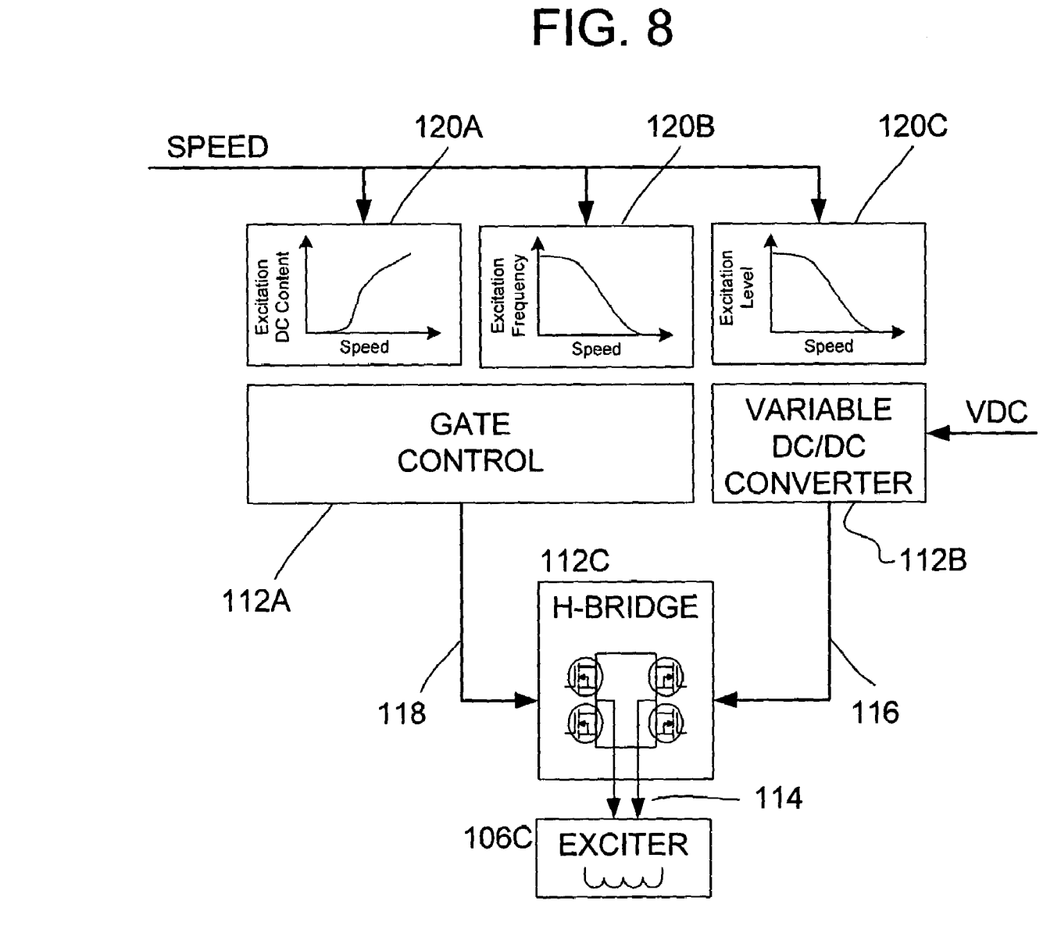
FIG. 8 is a more detailed block diagram of components of a rotor excitation controller that are suitable for implementing one or more embodiments of the excitation control system of FIG. 5.

Reference is now made to FIG. 8, which is a more detailed block diagram that illustrates an example of an implementation of the excitation control circuit 112 of FIG. 5. The excitation control circuit 112 includes a gate control 112A, a variable DC/DC converter 112B, and an H-bridge 112C. The variable DC/DC converter 112B preferably includes a control circuit (not shown) that is operable to program a specific peak—peak DC voltage on line(s) 116 as a function as the rotational speed of the polyphase machine 106. The gate control circuit 112A is preferably operable to produce commutation signals on line(s) 118 as a function of the rotational speed of the polyphase machine 106. The commutation signals on line 118 and/or the peak—peak voltage on line 116 may be utilized alone or in combination to vary the excitation voltage on line 114 to the exciter 106C.

As discussed above, in a first aspect the gate control circuit 112A is preferably operable to change the commutation signals on line 118 to cause the H-bridge 112C to produce the first rotor excitation voltage 114A or the second rotor excitation voltage 114B in response to the rotational speed of the polyphase machine 106. In another aspect, the gate control circuit 112A is preferably operable to increase the DC component of the second rotor excitation voltage 114B as a function of the rotational speed of the polyphase machine. For example, as illustrated in profile 120A, the gate control circuit 112A is preferably capable of adjusting the DC component of the second rotor excitation voltage 114B at least over a range of rotational speeds above the predetermined value (e.g., 1,000 RPM). Those skilled in the art will appreciate that the particular profile or curve expressing the relationship between the rotational speed of the polyphase machine 106 and the specific DC component of the second rotor excitation voltage may take on various characteristics, only one of such characteristics being shown in profile 120A. By way of example, when the second rotor excitation voltage 114B is a square wave, the gate control circuit 112A is preferably operable to increase and/or decrease the DC component of the second rotor excitation voltage 114B by changing a duty cycle of the commutation signals on line 118 in order to change the duty cycle of the second rotor excitation voltage 114B.

Figure 7:
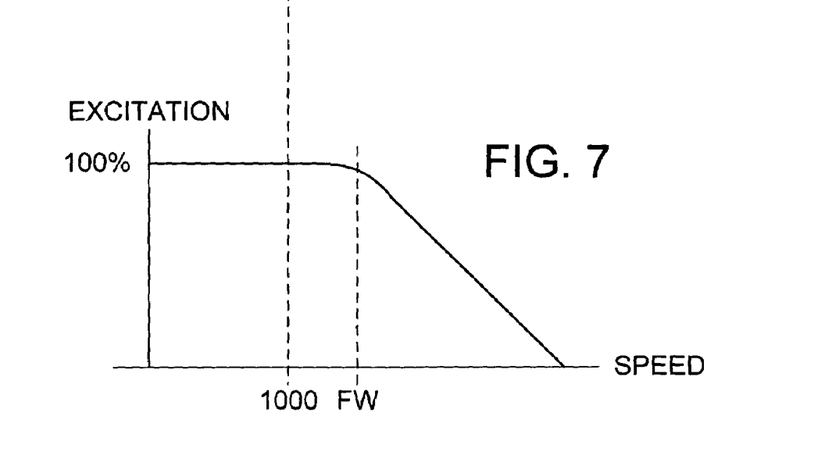
FIG. 7 is a graphical illustration of rotor excitation versus speed characteristics that may be produced by the excitation control system of FIG. 5.

With reference to FIG. 7, the excitation profile may be reduced to achieve field weakening beyond a specified rotational speed FW. One of the ways to weaken the field is to reduce the duty cycle of the of the second rotor excitation voltage 114B.

In accordance with a further aspect, the gate control circuit 112A is preferably operable to decrease a frequency of the AC component of the second rotor excitation voltage 114B as a function of the rotational speed of the polyphase machine 106. By way of example, the second profile 120B illustrates that the gate control circuit 112A is preferably responsive to the rotational speed of the polyphase machine over at least a range of rotational speeds above the predetermined value (e.g., 1,000 RPM) such that the frequency of the second rotor excitation voltage 114B decreases with increasing rotational speed. Those skilled in the art will appreciate that the second profile 120B represents but one of numerous profiles that may be employed to achieve desirable results from the polyphase machine 106. Again, the gate control circuit 112A is preferably operable to change the commutation signals on line 118 to achieve the excitation voltage frequency verses rotational speed characteristic.

With reference to FIG. 7, another way that the excitation profile may be reduced to achieve the field weakening beyond the rotational speed FW is to reduce the frequency of the second rotor excitation voltage 114B.

In accordance with a further aspect, the excitation control circuit 112 is preferably operable to decrease the peak amplitude of the second rotor excitation voltage 114B as a function of the rotational speed of the polyphase machine 106. For example, the third profile 120C illustrates that the variable DC/DC converter 112B is preferably operable to decrease the peak—peak voltage on line 116 to the H-bridge 112C as a function of the rotational speed over at least a range of rotational speeds above the predetermined value (e.g., 1,000 RPM). With reference to FIG. 7, still another way that the excitation profile may be reduced to achieve the field weakening beyond the rotational speed FW is to reduce the amplitude or duty-cycle of the second rotor excitation voltage 114B.

Those skilled in the art will appreciate that the specific circuit implementations of the gate control circuit 112A and/or the variable DC/DC converter 112B are so numerous that the inclusion of such details is omitted for the purposes of brevity and clarity. Such details, however, are believed well within the purview of those skilled in the art when taken in conjunction with the description herein.

Figure 9:
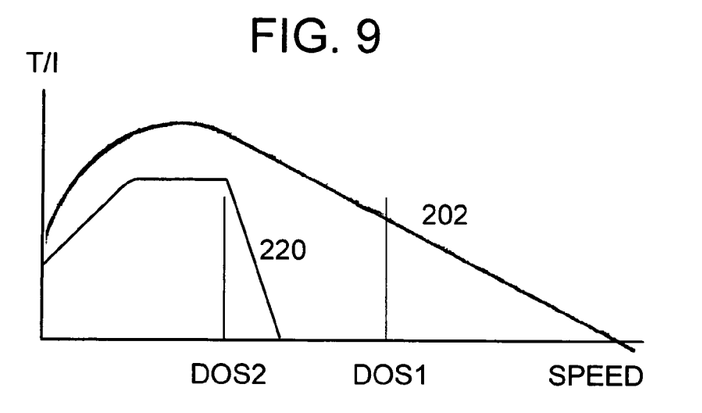
FIG. 9 is a graphical representation of torque and/or current versus speed characteristics of a polyphase motor that may be achieved in accordance with one or more embodiments of the system of FIG. 1.
Figure 10:
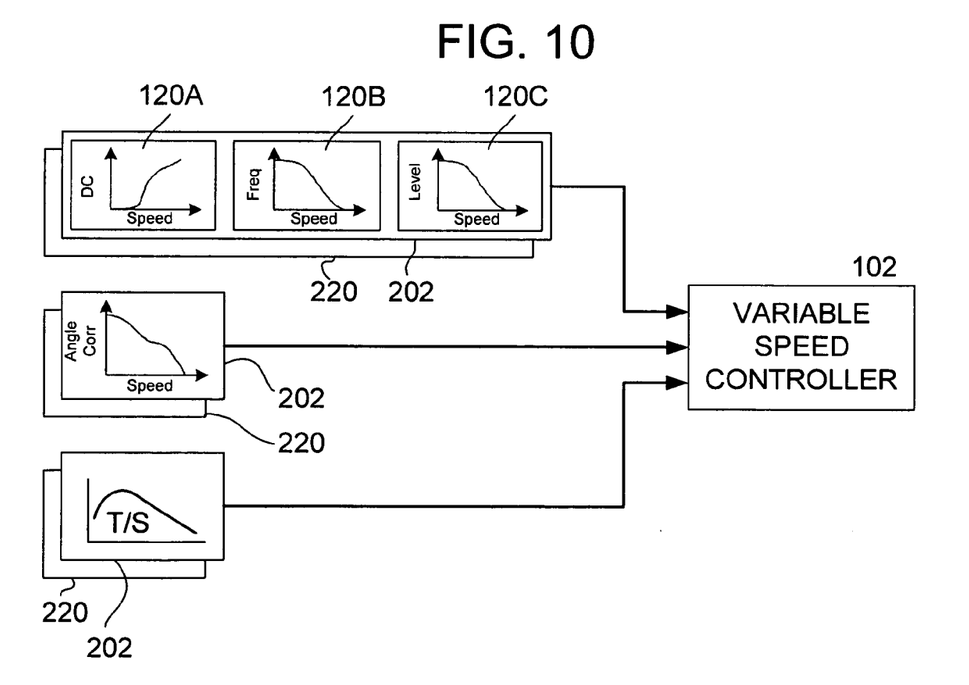
FIG. 10 is a partial block diagram and partial graphical representation providing further details of one or more embodiments suitable for implementing the system of FIG. 9.

Reference is now made to FIGS. 9 and 10, which illustrate one or more further embodiments of the present invention. FIG. 9 is a graphical representation of torque and/or current verses speed characteristics of the polyphase machine 106 that may be achieved in accordance with one or more further aspects of the system of FIG. 1. FIG. 10 is a partial block diagram and partial graphical representation providing further details of the system. The controller 102 is preferably operable to command a first torque (or current)/speed profile for the polyphase machine 106, such as the profile 202 (FIG. 9) during a first start cycle of the engine. Notably, the torque/speed profile 202 requires that the controller 102 and driver circuit 104 draw current from a source of DC power, which during a start cycle is typically from a battery. Thus, the current drawn from the battery in order to produce the desired torque from the polyphase machine 106 depletes the battery.

In accordance with one or more aspects of the present invention, the controller 102 is preferably operable to command a second torque (or current)/speed profile, such as profile 220, for the polyphase machine 106 when the first start cycle is unsuccessful. Notably, the first torque/speed profile 202 exhibits a higher peak torque and shorter torque producing profile than the second torque/speed profile 220. Indeed, the second torque/speed profile 220 preferably includes a substantially lower peak torque and a substantially longer torque producing profile.

In accordance with the embodiments discussed hereinabove, the controller 102 is preferably operable to automatically augment the angular position of the polyphase machine 106 as measured by, for example, the resolver 108 and angle controller 110, with a lead angle as a first function of rotational speed of the polyphase machine in order to achieve at least a portion of the first torque/speed profile 202. Thus, for example, the controller 102 may utilize a first table of rotational speeds verses drawn current from which to select an appropriate current setting to achieve the desired first torque/speed profile 202. The controller 102 is preferably further operable to change the determined current setting as a second function of rotation speed in order to achieve at least a portion of the second torque/speed profile 220. For example, this may entail employing a second table of rotational speeds verses inverter current from which the controller may choose lead angles to achieve the second torque/speed profile 220.

In accordance with a further aspect, the first torque/speed profile 202 preferably includes a first drop-off rotational speed DOS1 at which the controller 102 at least begins to command the polyphase machine 106 to stop providing starting torque to the engine. The second torque/speed profile 220 preferably includes a second drop-off rotational speed DOS2 at which the controller 102 at least begins to commands the polyphase machine 106 to stop providing starting torque to the engine. The first drop-off rotational speed DOS1 is preferably greater than the second drop-off rotational speed DOS2.

Assuming that an attempt to start the engine utilizing the polyphase machine 106 to provide starting torque does not result in ignition of the engine, the battery supplying the DC voltage to the controller 102 and/or the driver circuit 104 may be significantly depleted, sometimes by 50% or greater. By commanding the second torque/speed profile 220, optimized for the lowest battery energy consumption, the likelihood of a successful second attempt at starting the engine is increased.

The aspects of commanding different torque/speed profiles of the polyphase machine 106 are illustrated in FIG. 10 by way of further profiles identified as being with the first and second profiles 202, 220. It is noted that the embodiments hereinabove with respect to producing rotor excitation voltage 114 may also be adapted for use in connection with changing the torque/speed profile of the polyphase machine 106 based on a prior unsuccessful attempt at starting the engine. For example, the controller 102 may be operable to provide a first rotor excitation voltage 114 having parameters that include at least one of: (i) first AC component characteristics, (ii) first DC component characteristics, (iii) first frequency characteristics, and (iv) first magnitude characteristics, as functions of the rotational speed of the polyphase machine 106. It is understood that these characteristics have been discussed in significant detail hereinabove. Similarly, the controller 102 may be operable to provide a second rotor excitation voltage 114 having at least one parameter that differs from the parameters of the first rotor excitation voltage 114. Such differences in parameters are graphically represented by way of the different profiles 120A, 120B, 120C illustrated in FIG. 10. To this end, the controller 102 is preferably operable to (i) produce the first rotor excitation voltage 114 in connection with the first torque/speed profile; and (ii) produce the second rotor excitation voltage 114 in connection with the second torque/speed profile.

Advantageously, the ability to command different torque (or current)/speed profiles from the polyphase machine 106 during startup conditions, permits an increased likelihood in achieving ignition of an engine despite an earlier on successful start attempt that may have significantly depleted the battery. While the above discussion has focused on only a first and second start attempt, those skilled in the art will appreciate that further start attempts may be achieved utilizing the second torque/speed profile 220 or a further profile (not shown) if the second start attempt is also unsuccessful.

Figure 11:
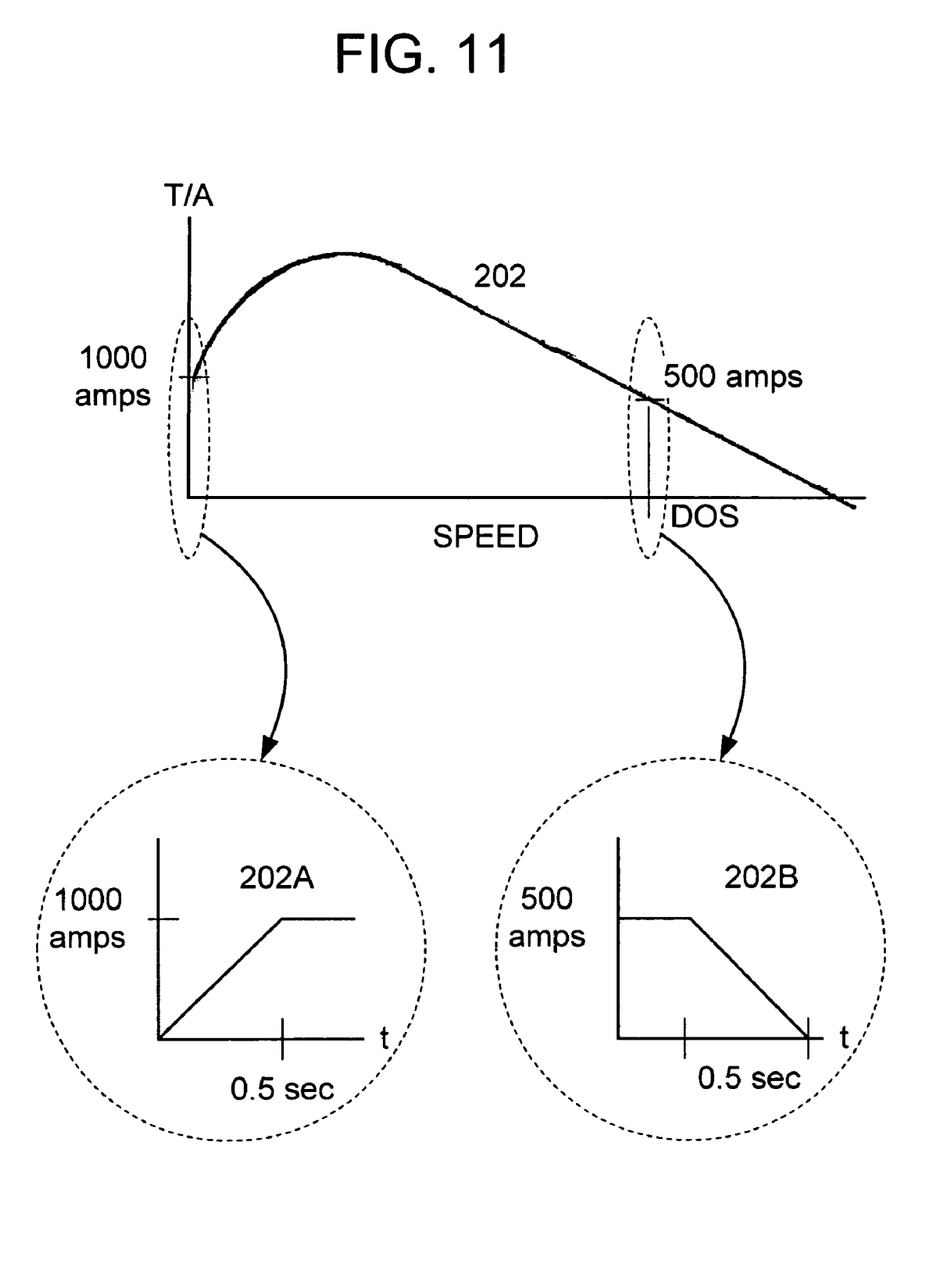
FIG. 11 is a graphical representation of further torque and/or current versus speed characteristics of a polyphase motor that may be achieved in accordance with one or more embodiments of the system of FIG. 1.

Reference is now made to FIG. 11, which is a graphical representation of further torque and/or current verses speed characteristics of the polyphase machine 106 that may be achieved in accordance with one or more further embodiments of the system of FIG. 1. For purposes of discussion, it is assumed that the torque/speed profile 202 is a desirable profile to start the engine and that a current of 1,000 amps is called for at substantially zero speed to achieve an initial torque. It has been discovered that if the controller 102 commands the polyphase machine 106 to produce a torque corresponding to 1,000 amps of current at substantially zero speed, significant mechanical stresses will be imposed on the polyphase machine 106 and on the mechanical linkages of the engine.

In accordance with one or more aspects of the present invention, the controller 102 is preferably operable to revise the torque/speed profile 202 to include a so-called soft start profile 202A in which the commanded torque/current at substantially zero speed is significantly less than the initial torque/current associated with 1,000 amps. Further, the controller 102 is preferably operable to ramp the current from substantially zero to the called for current/torque of 1,000 amps as a function of time, such as linearly from zero to the initial current in five (0.5) seconds. Those skilled in the art will appreciate that the slope of the ramp and the time may be adjusted in accordance with the particular design constraints of the overall system.

The torque/speed characteristic 202 may also include a drop-off rotational speed DOS at which it is desirable to stop commanding that the polyphase machine 106 provide torque to the engine, as would be the case when the engine has ignited. By way of example, the expected current at the DOS may be 500 amps. It has been discovered that a sudden command to significantly reduce the commanded current from 500 amps to zero would produce significant electrical stresses on the system, such as the driver circuit 104. Indeed, a sudden command to reduce the torque produced by the polyphase machine 106 represents a sudden drop in the load on the controller 102/driver circuit 104, which tends to result in significant voltage spikes, ringing, instabilities, etc. In accordance with one or more aspects of the present invention, the controller 102 is preferably operable to more slowly ramp the commanded current from the DOS level (e.g., 500 amps) to zero over a certain period of time. Again, those skilled in the art will appreciate that the slope of the ramp and the shape of the ramp may be adjusted in order to comport with the overall characteristics of the system.

It is noted that the methods and apparatus for controlling the polyphase machine 106 described hereinabove may be achieved utilizing suitable hardware, such as that shown in the drawings. It is noted that such hardware may be implemented utilizing any of the known technologies, such as standard digital circuits, analog circuits, any of the known processors that are operable to execute software and/or firmware programs, one or more programmable digital devices or systems, such as programmable read only memories (PROMs), programmable array logic devices (PALs), any combination of the above, etc. Indeed, while various circuit implementations of the embodiments of the present invention may have advantages and disadvantages, they are all within the spirit and scope of the invention as claimed.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
a controller and driver circuit operable to commutate windings of a polyphase machine such that electromagnetic fields of stator and rotor phases of the polyphase machine produce at least one of motoring and generating torque; and
a rotor excitation controller operable to: (i) provide a first rotor excitation voltage having substantially no DC component when a rotational speed of the polyphase machine is below a predetermined value, and (ii) provide a second rotor excitation voltage having a DC component when the rotational speed of the polyphase machine is above the predetermined value.

2. The apparatus of claim 1, wherein:
the first rotor excitation voltage is an AC signal of peak amplitude +/−A from a reference potential; and the second rotor excitation voltage is an AC signal with a DC offset having a peak amplitude of +/−A/2 from a reference potential of A/2.

3. The apparatus of claim 2, wherein:
the first and second rotor excitation voltages are substantially square wave signals.

4. The apparatus of claim 2, wherein the rotor excitation controller is operable to decrease the peak amplitude of the second rotor excitation voltage as a function of the rotational speed over at least a range of rotational speeds above the predetermined value.

5. The apparatus of claim 1, wherein the rotor excitation controller is operable to increase the DC component of the second rotor excitation voltage as a function of the rotational speed over at least a range of rotational speeds above the predetermined value.

6. The apparatus of claim 5, wherein:
the second rotor excitation voltage is substantially a square wave; and
the rotor excitation controller is operable to increase and decrease the DC component of the second rotor excitation voltage by changing a duty cycle of the second rotor excitation voltage.

7. The apparatus of claim 1, wherein:
the second rotor excitation voltage further includes an AC component; and
the rotor excitation controller is operable to decrease a frequency of the AC component of the second rotor excitation voltage as a function of the rotational speed over at least a range of rotational speeds above the predetermined value.

8. The apparatus of claim 7, wherein the rotor excitation controller is operable to increase the DC component of the second rotor excitation voltage as a function of the rotational speed over at least a range of rotational speeds above the predetermined value.

9. The apparatus of claim 7, wherein:
the second rotor excitation voltage is substantially a square wave; and
the rotor excitation controller is operable to increase and decrease the DC component of the second rotor excitation voltage by changing a duty cycle of the second rotor excitation voltage.

10. A method, comprising:
commutating windings of a polyphase machine such that electromagnetic fields of stator and rotor phases of the polyphase machine produce at least one of motoring and generating torque;
providing a first rotor excitation voltage having substantially no DC component when a rotational speed of the polyphase machine is below a predetermined value; and
providing a second rotor excitation voltage having a DC component when the rotational speed of the polyphase machine is above the predetermined value.

11. The method of claim 10, wherein:
the first rotor excitation voltage is an AC signal of peak amplitude +/−A from a reference potential; and
the second rotor excitation voltage is an AC signal with a DC offset having a peak amplitude of +/−A/2 from a reference potential of A/2.

12. The method of claim 11, wherein:
the first and second rotor excitation voltages are substantially square wave signals.

13. The method of claim 11, further comprising decreasing the peak amplitude of the second rotor excitation voltage as a function of the rotational speed over at least a range of rotational speeds above the predetermined value.

14. The method of claim 10, further comprising increasing the DC component of the second rotor excitation voltage as a function of the rotational speed over at least a range of rotational speeds above the predetermined value.

15. The method of claim 14, wherein:
the second rotor excitation voltage is substantially a square wave; and
the method further comprises increasing or decreasing the DC component of the second rotor excitation voltage by changing a duty cycle of the second rotor excitation voltage.

16. The method of claim 10, wherein:
the second rotor excitation voltage further includes an AC component; and
the method further comprises decreasing a frequency of the AC component of the second rotor excitation voltage as a function of the rotational speed over at least a range of rotational speeds above the predetermined value.

17. The method of claim 16, further comprising increase the DC component of the second rotor excitation voltage as a function of the rotational speed over at least a range of rotational speeds above the predetermined value.

18. The method of claim 16, wherein:
the second rotor excitation voltage is substantially a square wave; and
the method further comprises increasing or decreasing the DC component of the second rotor excitation voltage by changing a duty cycle of the second rotor excitation voltage.

19. An apparatus, comprising:
a driver circuit operable to commutate windings of a polyphase machine in response to commutation control signals; and
a controller operable to: (i) produce the commutation control signals such that electromagnetic fields of stator phases of the polyphase machine at least lead electromagnetic fields of rotor phases of the polyphase machine to produce starting torque for an engine from a battery system, (ii) command a first torque/speed profile for the polyphase machine during a first start cycle of the engine, and (iii) command a second torque/speed profile, different than the first torque/speed profile, for the polyphase machine when the first start cycle is unsuccessful.

20. The apparatus of claim 19, wherein the controller is operable to monitor an angular position of the rotor of the polyphase machine, determine and automatically augment the angular position with a lead angle, measured between the electromagnetic fields of the stator and rotor phases, as a first function of rotational speed of the polyphase machine, in order to achieve at least a portion of the first torque/speed profile.

21. The apparatus of claim 20, wherein the controller is operable to change the determined lead angle as a second function of rotational speed, in order to achieve at least a portion of the second torque/speed profile.

22. The apparatus of claim 19, wherein: the first torque/speed profile includes a first peak torque; the second torque/speed profile includes a second peak torque; and the first peak torque is greater than the second peak torque.

23. The apparatus of claim 19, wherein:
the first torque/speed profile includes a first drop off rotational speed at which the controller at least begins to command the polyphase machine to stop providing starting torque to the engine;

the second torque/speed profile includes a second drop off rotational speed at which the controller at least begins to command the polyphase machine to stop providing starting torque to the engine; and the first drop off rotational speed is greater than the second drop off rotational speed.

24. The apparatus of claim 19, wherein the controller is further operable to:

provide a first rotor excitation voltage having parameters that include at least one of first AC component characteristics, first DC component characteristics, first frequency characteristics, and first magnitude characteristics, as functions of the rotational speed of the polyphase machine; and provide a second rotor excitation voltage having parameters that include at least one of second AC component characteristics, second DC component characteristics, second frequency characteristics, and second magnitude characteristics, as functions of the rotational speed of the polyphase machine.

25. The apparatus of claim 24, wherein the controller is operable to: (i) produce the first rotor excitation voltage in connection with the first torque/speed profile; and (ii) produce the second rotor excitation voltage in connection with the second torque/speed profile.

26. A method comprising:

commutating windings of a polyphase machine in response to commutation control signals;

producing the commutation control signals such that electromagnetic fields of stator phases of the polyphase machine at least lead electromagnetic fields of rotor phases of the polyphase machine to produce starting torque for an engine from a battery system;

commanding a first torque/speed profile for the polyphase machine during a first start cycle of the engine; and commanding a second torque/speed profile, lower than the first torque/speed profile, for the polyphase machine when the first start cycle is unsuccessful.

27. The method of claim 26, further comprising monitoring an angular position of the rotor of the polyphase machine, determining and automatically augmenting the angular position with a lead angle, measured between the electromagnetic fields of the stator and rotor phases, as a first function of rotational speed of the polyphase machine, in order to achieve at least a portion of the first torque/speed profile.

28. The method of claim 27, further comprising changing the determined lead angle as a second function of rotational speed, in order to achieve at least a portion of the second torque/speed profile.

29. The method of claim 26, wherein: the first torque/speed profile includes a first peak torque; the second torque/speed profile includes a second peak torque; and the first peak torque is greater than the second peak torque.

30. The method of claim 26, wherein:

the first torque/speed profile includes a first drop off rotational speed at which the controller at least begins to command the polyphase machine to stop providing starting torque to the engine;

the second torque/speed profile includes a second drop off rotational speed at which the controller at least begins to command the polyphase machine to stop providing starting torque to the engine; and the first drop off rotational speed is greater than the second drop off rotational speed.

31. The method of claim 26, further comprising:

providing a first rotor excitation voltage having parameters that include at least one of first AC component characteristics, first DC component characteristics, first frequency characteristics, and first magnitude characteristics, as functions of the rotational speed of the polyphase machine; and providing a second rotor excitation voltage having parameters that include at least one of second AC component characteristics, second DC component characteristics, second frequency characteristics, and second magnitude characteristics, as functions of the rotational speed of the polyphase machine.

32. The method of claim 31, further comprising: producing the first rotor excitation voltage in connection with the first torque/speed profile; and producing the second rotor excitation voltage in connection with the second torque/speed profile.

* * * * *